May 7, 1968  J. HUREAU  3,381,337
APPARATUS FOR THE PRODUCTION OF PROFILED PIECES
SHOWING A LACUNAR OR RETICULATED STRUCTURE
Original Filed Dec. 18, 1961  3 Sheets-Sheet 1

United States Patent Office 3,381,337
Patented May 7, 1968

3,381,337
APPARATUS FOR THE PRODUCTION OF PROFILED PIECES SHOWING A LACUNAR OR RETICULATED STRUCTURE
Jacques Hureau, Paris, France, assignor to Societe Generale Alimentaire GASA, Neuilly-sur-Seine, Seine, France, a French company
Original application Dec. 18, 1961, Ser. No. 159,965, now Patent No. 3,252,181, dated May 24, 1966. Divided and this application Apr. 7, 1966, Ser. No. 541,028
7 Claims. (Cl. 18—12)

ABSTRACT OF THE DISCLOSURE

This invention relates to a machine for producing plastics articles having partly or fully a net-like structure; this machine comprises two extrusion die members reciprocatable between a first, contact position and a second, gap-defining position; one at least of said die members is provided with extrusion channels opening near to the gap defined thereby in said second position, and means are provided to feed plastics in an extrudable state to said extrusion channels, as well as to the gap defined in said second position.

---

This is a division of my copending application Ser. No. 159,965, filed on Dec. 18, 1961, now Patent No. 3,252,181, for "Production of Profiled Pieces Showing a Lacunar or Reticulated Structure."

This invention relates to a machine for producing articles, such as sheets, plates, tubes, etc., having at least in part a net-like or lacunar structure (grid, trellis, net, etc.), in a solidifiable material, specially a synthetic material.

The extrusion machine according to the invention generally comprises two extrusion die members having elongated working surfaces extending along two elongated borders; the die members are arranged with their working surfaces facing each other, and to be displaceable with respect to each other between a first position, in which their working surfaces are in close contact with each other, and a second position, in which their working surfaces are separated by a narrow elongated extrusion space; a plurality of extrusion channels extend through at least one of the die members between the borders of its working surface, and means are provided for continuously feeding with the solidifiable material, the extrusion space and the inlets of the extrusion channels, and for alternately displacing the die members between their first position, in which only a plurality of substantially parallel strands of solidifiable material is extruded through the outlets of the extrusion channels, and their second position, in which a single transverse strand is extruded through the extrusion space. Stopping means may be arranged for stopping the outlets of the extrusion channels only when the die members are in their second position. Moreover, the narrow, elongated extrusion space has preferably a uniform width, and the outlets of the extrusion channels have preferably a cross-sectional size nearly equal to the uniform width of the extrusion space. Some at least of the extrusion channels may have closed cross-sections, and others may consist of grooves in the working surface of the die member.

An embodiment of the extrusion machine according to the invention, specially adapted for extruding substantially flat articles, comprises a stationary, hollow, tubular extrusion die member of rectangular cross section, and a movable, solid extrusion die member, disposed inside the tubular die member with its end faces in registration with the respective open end faces of the tubular die member. The two die members have two pairs of flat working surfaces facing each other and extending substantially in the axial direction of the tubular die member between the end faces thereof. The movable die member is further displaceable within the stationary die member in a direction transverse to its axial direction, between two operative positions, in each of which the one pair of the facing, flat working surfaces is in close contact, and a narrow space is maintained between the other pair of facing working surfaces. Moreover, a plurality of extrusion channels extend through at least one of the die members between the two open end faces of the stationary die member, and means are provided for continuously feeding with the solidifiable material at least a part of the one open end face of the stationary die member and the inlets of the extrusion channels, and for alternately displacing the movable die member between its two operative positions.

Another embodiment of the extrusion machine according to the invention comprises a plurality of extrusion die orifices for continuously extruding a plurality of spaced, parallel strands, and a slit juxtaposed to this plurality of die orifices, for successively extruding single strands transverse to and partly integral with said parallel strands. Means are provided for periodically displacing the slit and the plurality of die orifices with respect to each other, in the axial direction of the die orifices, along to a position in which each single strand is extractable from the slit, as an integral part of the extruded article, by the continuous movement of the extruded article in the said axial direction.

These and further objects and features of the invention will become more apparent from the following description and accompanying drawing wherein:

FIGS. 1 and 2 are plan views respectively of the two operative positions of a schematic extrusion machine illustrating the principles of the invention;

FIGS. 3 and 4 are cross-section views along the lines 3—3 and 4—4 of FIGS. 1 and 2.

A net-like article can be made, in each of the apparatus embodiments later described, in the manner to be described from any extrudable material notably:

(1) Synthetic materials, particularly thermoplastic and thermosetting compositions, as well as natural and synthetic rubbers; in the first case, the thermoplastic material is heated in the extrusion machine to its softening temperature, then it is cooled suddenly, for example by immersion in a liquid, by the action of a current of cold air, etc.; the two dies of the machine to be described are then maintained preferably at the extrusion temperature. These dies are made preferably of a metal which is a good heat conductor.

(2) Materials extrudable in a moist state, such as viscose, which can be extruded cold, the hardening thereof being obtained by immersing in, or by spraying with an appropriate product.

(3) Glass.

(4) Metals and their alloys in pasty or molten state.

Figure 1:
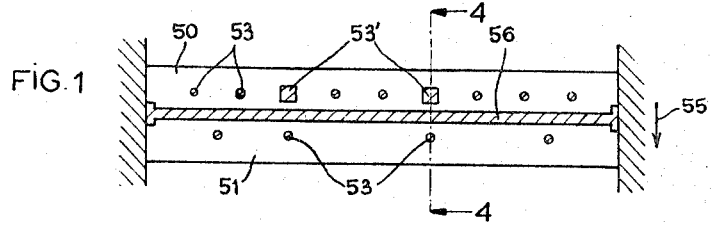
Figure 2:
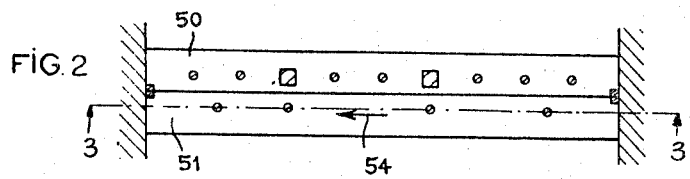
Figure 3:
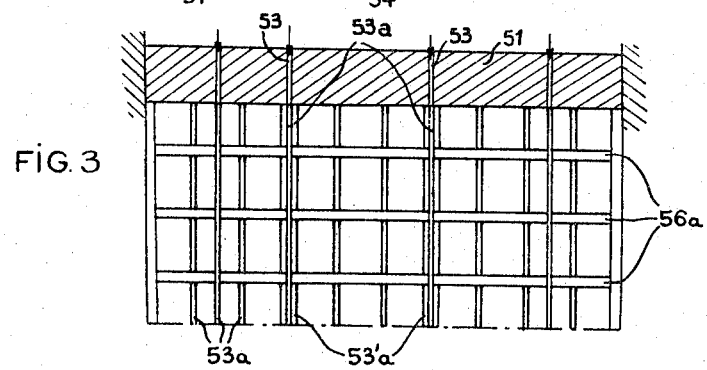
Figure 4:

FIGS. 1 and 2 illustrate schematically the operation of the most general embodiment of the machine according to the invention, which comprises two extrusion dies movable relative to one another, and of which one at least is provided with extrusion channels to which extrudable material of the type above described, is provided for making articles according to the invention. On FIGS. 1 and 2, the two dies 50 and 51 are straight and parallel, but they may also be curved, and they are provided with extrusion channels 53, 53', substantially parallel with one another, and substantially perpendicular to the direction in which the said dies extend, so that the end of these channels are seen on FIGS. 1 and 2. In the example illustrated, the extrusion channels with which the dies 50 and 51 are provided have close transverse crosssections, which differ both in form and dimensions, not only from one die ot the other, but even in a same die. The die 50 for example comprises channels of circular cross-section 53, and channels 53' of rectangular cross-section, while the die 51 comprises only channels of circular cross-section 53. Moreover, the two dies 50 and 51 comprise different numbers of extrusion channels, and the channels of one die are not facing the channels of the other die. The two dies 50 and 51 can be displaced relative to one another, one for example being fixed and the other movable. It is already known to use couples of dies of this kind to make sheets, plates or tubes having a net-like structure, by displacing the two dies 50 and 51 relative to one another in the sense of the arrow 54 on FIG. 2 that is to say in making the dies 50 and 51 slide while maintaining them in close contact with one another, or at least at a constant distance from one another. One chief aim of the present invention is to extrude sheets, plates or tubes having at least in part a net-like structure, by using a couple of movable dies such as that illustrated on FIGS. 1 and 2, and alternately drawing together and separating the dies by a relative movement is the direction of the arrow 55 on FIG. 1. The process of forming the net-like structure is as follows: When the two dies 50 and 51 are brought into close contact with one another as illustrated in FIG. 2, the extrudable material, which is continuously discharged above the two dies 50 and 51, in the direction of their extrusion channels 53, 53', is extruded only through channels 53, 53', to form thereby linear, parallel elements which, on FIG. 3 have been designated respectively by 53a, 53a'. When the two dies 50 and 51 have been separated from one another in the sense of the arrow 55 (FIG. 1), and they are separated by a space 56 of uniform width, the extrudable material is extruded through this space 56, as a single linear element, transverse to the straight, parallel elements 53a, 53a' extruded through the channels 53, 53'. In the example illustrated, where these channels 53, 53' have closed sections, the connection between the linear elements 53a, 53a' and the linear elements 56a which are formed successively, takes place clearly after the extrudable material leaves the outlets of the channels 53 and 53', that is to say below the dies 50 and 51, as visible on FIG. 4. However, the channels 53, 53' of dies 50 and 51 may also open on the surfaces of dies 50 and 51, which are facing one another, that is in the space 56 between the dies when they are separated from one another, FIG. 1. In this last embodiment, the channel outlets are closed by the surface of the other die when the dies are in close contact, FIG. 2. In this case, the connection between the linear elements 53a, 53a' and the linear elements 56a takes place precisely in the space 56 between the two dies 50, 51. With the embodiment illustrated on FIG. 3, the vertical linear elements 53a, 53a' are on one side or the other of the horizontal linear elements 56a, according to whether they have been extruded through the die 50 or the die 51.

Vertical elements 53a, 53a' being all on the same side of the horizontal elements 56a can be obtained by removing the extrusion channels of one of the two dies. It is also possible to obtain a sheet or plate having a net-like structure and a uniform thickness, by providing means for stopping the outlets of the extrusion channels of the dies 50, 51, only when these dies are separated from one another, FIG. 1, space 56 having then preferably a uniform width nearly equal to the cross-sectional size of the outlets of the extrusion channels.

The machine just described with reference to FIGS. 1 and 2 may also be operated in keeping the two dies 50 and 51 permanently at a constant distance from one another, so as to permanently extrude the extrudable material through the channel 53, 53' of the two dies, as well as through the space 56, FIG. 1. The extruded article is a sheet or plate of uniform thickness, one at least of the two faces of which has continuous parallel ribs, similar to reinforcing ribs. By periodically modifying the spacing of the two dies, it is also possible to form continuous ribs transverse to the former.

Figure 5:
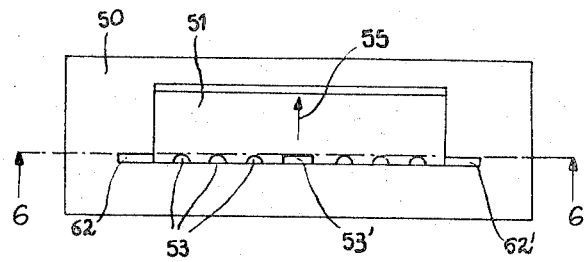
FIG. 5 is a plan view of another embodiment of the invention.
Figure 7:
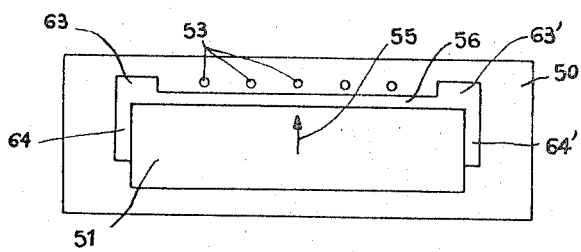
FIG. 7 is a plan view of another embodiment of the invention.

FIGS. 5 and 7 are plan views of two further embodiments of the machine, the operation of which has been described above with reference to FIGS. 1 and 2. Similar reference numerals have been employed in the various embodiments to facilitate illustrating similar and alike elements. Two dies 50 and 51 have extrusion channels 53, 53' and are mounted so as to slide with respect to one another, in a direction perpendicular to their extrusion channels 53, 53', which is indicated by arrow 55. The fixed die 50 is a tubular, hollow member, in which the solid die 51 is located so as to be displaceable alternatively between two positions, one in which the two dies 50, 51 are in close contact by their facing surfaces, FIG. 5, and the other in which the facing surfaces of the two dies 50 and 51 are separated from one another so as to provide a space 56 between them, FIG. 7. In the embodiment of FIG. 5 only the movable die 51 comprises extrusion channels, which open on the surface of die 51 which faces the die 50. There are provided two kinds of channels 53, 53', different in the forms and dimensions of their cross-sections. In the embodiment of FIG. 7, only the fixed die 50 comprises extrusion channels 53, having closed cross-sections and being all identical with one another.

Figure 6:
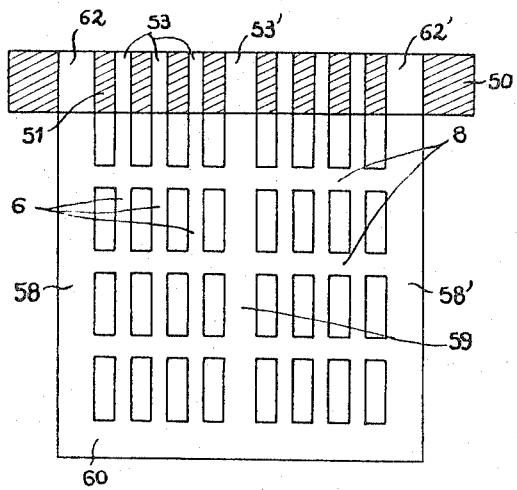
FIG. 6 is a cross-section view along the line 6—6 of FIG. 5.

There will now be briefly described the extrusion of the grid-like article of FIG. 6 by means of the extruder of FIG. 5. The two full vertical borders 58, 58' of the article of FIG. 6 are formed by continuously extruding the material through inner recesses 62, 62' in the fixed die 50 of FIG. 5, which are never stopped by the movable die 51, when it is displaced. The vertical strips 6 are formed by extruding the material through the open channels 53 of the movable die 51. The center strip 59 is also formed by extruding the material through channel 53' of the movable die 51. The horizontal strips connecting the borders 58, 58' of the grid-like article and its vertical strips 6, as well as the center strip 59, are formed by extruding the material through the space between the two dies 50 and 51 when the surface of the movable die 51, on which the channels 53, 53' open, is brought into the plane, the trace of which is indicated by the line 6—6 of FIG. 5. Means may be provided for stopping the outlets of the extrusion channels 53, 53' so as to interrupt extruding the vertical strips 6 and the center strip 59 during the formation of each horizontal strip 8. The vertical strips 58, 58', 59 on the one part, and the horizontal strips 8 and 60—this last forming the lower full border of the grid article—on the other part, connect themselves together in the space between the two dies 50 and 51, through the open faces of the extrusion channels 53, 53'.

Figure 8:
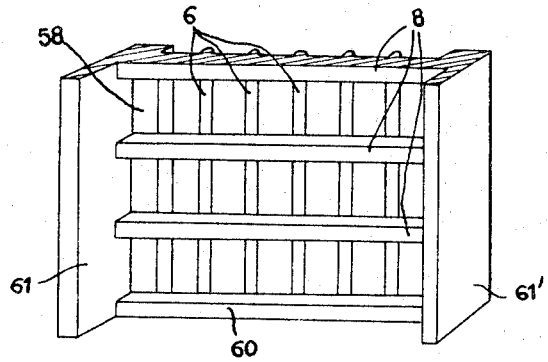
FIG. 8 is a perspective view of an article extruded with the machine illustrated in FIGS. 6, 7.

With reference to the conditioning receptacle in plastic material, having a grid-like base, which is shown on FIG. 8, the full sides 61, 61' of this receptacle are formed by continuously extruding the extrudable material through inner recesses 64, 64' in the fixed die 50, which are never stopped by the movable die 51. The full edges 58, 58' of the grid base of the receptacle are continuously extruded through similar inner recesses 63, 63'. The horizontal bars 8 of this grid base are formed by extruding the material through the space 56 between the two dies 50 and 51 when they are in their relative position illustrated on FIG. 7. The vertical bars 6 of the grid base are formed by continuously extruding the material through the channels with closed cross-section 53 of the fixed die 50, the outlets of these extrusion channels being kept open permanently. The vertical bars 6 and the horizontal bars 8, 60 of the base of the receptacle connect themselves together below the dies 50 and 51, that is to say outside the outlets of the extrusion channels 53.

Figure 9:
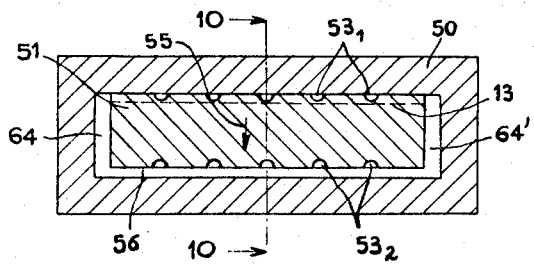
FIG. 9 is a cross-section view of still another embodiment of the invention and taken along line 9—9 of FIG. 10.
Figure 10:
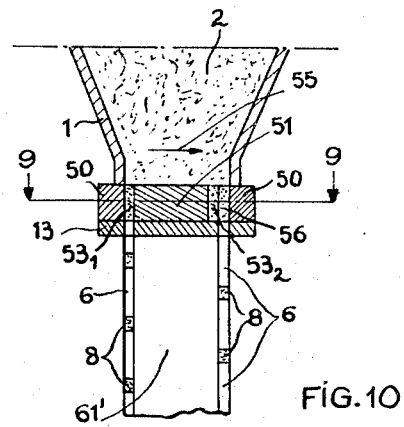
FIG. 10 is a cross-section view along the line 8–10 of FIG. 9.

The embodiment illustrated on FIGS. 9 and 10 comprise a hollow, tubular fixed die 50 and a solid, movable die 51. Open extrusion channels 53₁, 53₂ are provided on two flat surfaces of die 51, which face corresponding inner, flat surfaces of the hollow, fixed die 50. This machine can extrude a sort of tube having a rectangular cross-section, and comprising two full opposed sides 61, 61', which are continuously extruded through the recesses of constant size 64, 64', and two grid-like sides, which are extruded as the grid-like article of FIG. 6. The horizontal elements 8 of said two grid-like sides are staggered as shown on FIG. 10. A plate 13 split into a rectangular ring is located beneath the dies 50 and 51 FIG. 10, to regulate the thickness of the extruded tube. By splitting this tube along one of its edges, a conditioning element, particularly in a flexible material, can be obtained.

Figure 11:
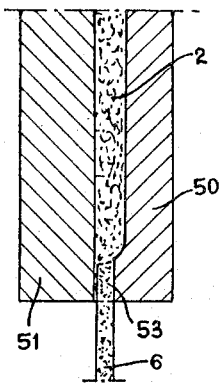
FIGS. 11 and 12 are cross-section views respectively of the two operative positions of still another embodiment of the invention.
Figure 12:
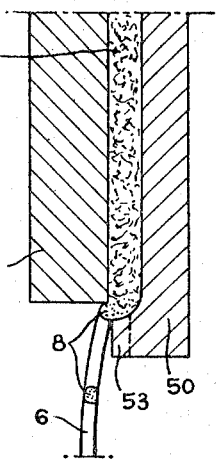

The embodiment shown on FIGS. 11 and 12 comprises a movable die 50 provided with extrusion channels 53, a stationary die 51, and means for displacing the movable die 50 parallel to the axial direction of said extrusion channels 53. In the position of dies 50, 51 which is shown on FIG. 11 the extrudable material is extruded only through the channels 53 so as to form parallel linear elements (vertical) 6. In the position of dies 50, 51 which is illustrated on FIG. 12, the material is extruded through the unmasked slit between the two dies 50, 51, so as to form a single linear element (horizontal) 8. Appropriate means, not shown, may be adapted for interrupting the formation of the parallel elements 6 each time one element 8 is extruded.

It is to be understood that, in the position of FIG. 12, the extruded single element 8 is extracted from the slit, as an integral part of the extruded article, by the continuous movement of the extruded article in the axial direction, that is in the direction of the movement of die 50.

The embodiments of the invention previously described can be easily adapted to extrude at least in part net-like articles, having parallel, longitudinal strips of different colours and widths. This can be achieved by dividing the distribution chamber in a corresponding number of sub-chambers, each of which is fed, through a separate channel, with an extrudable material having a desired colour.

What I claim is:

1. A machine for producing, from a solidifiable material, articles having at least in part a net-like structure, comprising in combination two extrusion die members having elongated working surfaces adapted to come in close contact with each other, each of said elongated working surfaces extending between a first and a second elongated border, said die members being arranged with their working surfaces facing each other, and mounted to be displaceable with respect to each other in a direction perpendicular to their working surfaces between a first position, in which their working surfaces are in close contact with each other, and a second position, in which their working surfaces are separated by a narrow elongated extrusion space having narrow, elongated input and output openings between the respective first and second borders of the working surfaces, at least one of said die members having a plurality of extrusion channels, each extending through said at least one of said die members from an inlet to an outlet arranged near to the second border of the working surface, means for continuously feeding with the solidifiable material the input opening of the said extrusion space and the inlets of said extrusion channels, and means for alternately displacing said die members between their first position, in which only a plurality of substantially parallel strands of solidifiable material is extruded through the outlets of said extrusion channels, and their second position, in which a single transverse strand is extruded through the narrow, elongated output opening of said extrusion space.

2. A machine for producing, from a solidifiable material, articles having at least in part a net-like structure, comprising in combination two extrusion die members having elongated working surfaces adapted to come in close contact with each other, each of said elongated working surfaces extending between a first and a second elongated border, said die members being arranged with their working surfaces facing each other, and being mounted to be displaceable with respect to each other in a direction perpendicular to their working surfaces between a first position, in which their working surfaces are in close contact with each other, and a second position, in which their working surfaces are separated by a narrow elongated extrusion space, having narrow, elongated input and output openings between the respective first and second borders of the working surfaces, at least one of said die members having a plurality of extrusion channels, each extending through said at least one of said die members from an inlet to an outlet arranged near to the second border of the working surface, means for continuously feeding with the solidifiable material the input opening of said extrusion space and the inlets of said extrusion channels, means for stopping the outlets of said extrusion channels, said stopping means being arranged to be operative only when said die members are in their second position, and means for alternately displacing said die members between their first position, in which only a plurality of substantially parallel strands of solidifiable material is extruded through the outlets of said extrusion channels, and their second position, in which only a single transverse strand is extruded through the narrow, elongated output opening of said extrusion space.

3. The machine of claim 2, in which the narrow, elongated extrusion space has a uniform width all along its elongated output opening, and the outlets of the extrusion channels have a cross-sectional size nearly equal to the uniform width of said extrusion space.

4. The machine of claim 1, in which some at least of the extrusion channels have closed cross-sections.

5. The machine of claim 1, in which some at least of the extrusion channels consist of grooves in the working surface of the die member.

6. A machine for producing, from a solidifiable material, articles having at least in part a net-like structure, comprising in combination a stationary, hollow, tubular extrusion die member of rectangular cross section, having a first and a second open end faces, a movable solid extrusion die member, having two solid end faces and disposed inside said tubular die member with its solid end faces in registration with the respective open end faces of said tubular die member, said die members having two pairs of flat working surfaces facing each other and extending substantially in the axial direction of the tubular die member between the respective end faces of said die members, and said movable die member being mounted to be displaceable within said stationary die member in a direction perpendicular to said axial direction between two operative positions, in each of which the one pair of said facing, flat, working surfaces is in close contact and a narrow space is maintained between the other pair of facing working surfaces, at least one of said die members having a plurality of extrusion channels, each extending through said at least one of said die members between an inlet and an outlet respectively arranged near to said first and second open end faces of the stationary die member, means for continuously feeding with the solidifiable material at least a part of the first open end face of said stationary die member and the inlets of said extrusion channels, and means for alternately displacing said movable die member between its two operative positions.

7. A machine for producing, from a solidifiable material, articles having at least in part a net-like structure, comprising, means defining a plurality of extrusion die orifices for continuously extruding a plurality of spaced, parallel strands, means operable for defining a slit juxtaposed to said plurality of die orifices, for successively extruding single strands transverse to and partly integral with said parallel strands, and means for periodically displacing said slit and said plurality of die orifices with respect to each other, in the axial direction of said die orifices, along to a position in which each single strand is extractable from said slit, as an integral part of the extruded article, by the continuous movement of said extruded article in said axial direction.

References Cited
UNITED STATES PATENTS 3,252,181   5/1966   Hareau _____ 18—12

WILLIAM J. STEPHENSON, *Primary Examiner.*

J. SPENCER OVERHOLSER, *Examiner.*